(12) United States Patent
Tamura

(10) Patent No.: US 7,204,595 B2
(45) Date of Patent: *Apr. 17, 2007

(54) PROJECTOR AND METHOD OF CORRECTING PROJECTED IMAGE DISTORTION

(75) Inventor: Youichi Tamura, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 10/962,619

(22) Filed: Oct. 13, 2004

(65) Prior Publication Data

US 2005/0078282 A1 Apr. 14, 2005

(30) Foreign Application Priority Data

Oct. 14, 2003 (JP) ............................ 2003-353471

(51) Int. Cl.
G03B 21/00 (2006.01)
G03B 21/14 (2006.01)
H04N 3/22 (2006.01)
H04N 3/26 (2006.01)

(52) U.S. Cl. ........................... 353/69; 353/70; 348/745

(58) Field of Classification Search ................. 353/69, 353/70, 122, 94; 348/745–747

See application file for complete search history.

(56) References Cited

U.S. PATENT DOCUMENTS 6,592,228 B1 * 7/2003 Kawashima et al. .......... 353/69
6,877,864 B1 * 4/2005 Tamura et al. ................. 353/7

FOREIGN PATENT DOCUMENTS

| JP | 2001-83949 A | 3/2001 |
| JP | 2002-006391 A | 1/2002 |
| JP | 2002-044571 A | 2/2002 |
| JP | 2003-005278 A | 1/2003 |
| JP | 2004-32484 A | 1/2004 |
| JP | 2004-260785 A | 9/2004 |

* cited by examiner

*Primary Examiner*—Melissa Jan Koval
*Assistant Examiner*—Andrew Kong
(74) *Attorney, Agent, or Firm*—Sughrue Mion, PLLC

(57) ABSTRACT

A projector has a distortion correcting circuit for correcting a distorted quadrangular projected image, which is projected onto a projection surface along a projection optical axis inclined in at least one of leftward, rightward, upward, and downward directions, into a rectangular corrected image, such that one of the vertexes B, D on the opposite ends of either one of two diagonal lines of the rectangular corrected image is positioned on one side La of the outer edge of a projection range of the projected image and the other vertex on another side Lb that is positioned adjacent to the one side La.

17 Claims, 6 Drawing Sheets

PROJECTOR AND METHOD OF CORRECTING PROJECTED IMAGE DISTORTION

BACKGROUND OF THE INVENTION

1. Field of the Invention

The present invention relates to a projector for projecting an image on a projection surface such as a screen or the like and a method of projecting an image, and more particularly a projector for correcting a distortion of an image to be projected onto a projection surface and projecting a corrected image onto the projection surface, and a method of correcting a distortion of an image to be projected.

2. Description of the Related Art

Projectors are often limited to certain installed positions depending on the environment in which they are used, and occasionally have their projection optical axis inclined to the projection surface such as a screen or the like. If the projection optical axis is inclined, then a projected image which should have a rectangular image area properly projected on the projection surface is distorted into a trapezoidal shape known as keystone. Conventional projectors have a distortion correcting circuit for correcting a trapezoidal image into a rectangular image, i.e., for performing a keystone distortion correcting process.

In recent years, the distortion correcting circuit incorporated in projectors that are finding widespread use is capable of automatically correcting an image distortion in upward and downward, or horizontal, directions on the projection surface and allowing an image distortion to be manually corrected in leftward and rightward, or vertical, directions on the projection surface. There are available various horizontal distortion correction processes depending on the structural details and specifications of the projectors, and various proposals have been made to improve the ease with which the users operate the projectors.

One conventional projector disclosed in Japanese laid-open patent publication No. 2003-5278, for example, is a liquid crystal projector having an acceleration sensor for detecting an angle of tilt in the upward and downward directions of the projection optical axis with respect to the projection surface such as a screen or the like.

In the near future, projectors having an automatic distortion correcting circuit for automatically correcting image distortions in both vertical and horizontal directions on the projection surface are expected to gain popularity on the market, so that the horizontal distortion correcting process which is currently be performed manually will be automatized.

However, since image distortions are corrected by the distortion correcting circuit, corrected images are inevitably made smaller than images prior to being corrected, and the image quality of smaller images is low.

The projectors with the automatic distortion correcting circuit are not required to take into account the ease with which the users operate the projectors for manually correcting image distortions in the horizontal direction. It is desirable for those projectors to set the projection optical axis at as large an angle of tilt to the projection surface as possible in order to increase the freedom of installed positions for the projectors.

Therefore, projectors are needed to have an increase in the freedom of installed positions for the projectors with respect to the position of the screen and also to reduce a degradation of the image quality of images that are corrected by the distortion correcting circuit.

SUMMARY OF THE INVENTION

It is therefore an object of the present invention to provide a projector which is capable of increasing the freedom of an installed position for the projector with respect to the position of the screen and of reducing a degradation of the image quality of images that are corrected by a distortion correcting circuit.

To achieve the above object, there is provided a projector having distortion correcting means for correcting a distorted quadrangular projected image, which is projected onto a projection surface along a projection optical axis inclined in at least one of leftward, rightward, upward, and downward directions, into a rectangular corrected image, such that one of the vertexes on the opposite ends of either one of two diagonal lines of the rectangular corrected image is positioned on one side of the outer edge of a projection range of the projected image and the other vertex on another side that is positioned adjacent to the one side.

With the projector according to the present invention, since the distortion correcting means keeps the corrected image in a maximum size within the projection range of the projected image, any reduction in the image quality due to a contraction of the corrected image can be suppressed. As the distortion correcting means performs the above correcting process, the corrected image is obtained satisfactorily even if the projection optical axis is inclined at a relatively large angle of tilt to the projection surface. Consequently, a large allowable range is available for the angle of tilt of the projection optical axis with respect to the projection surface, allowing the projector to be installed in positions with increased freedom.

The upward and downward directions used herein represent vertical directions on the projection surface, and the leftward and rightward directions represent horizontal directions perpendicular to the vertical directions.

According to the present invention, there is also provided a method of correcting an image distortion, comprising the step of correcting a distorted quadrangular projected image, which is projected onto a projection surface along a projection optical axis inclined in at least one of leftward, rightward, upward, and downward directions, into a rectangular corrected image, such that one of the vertexes on the opposite ends of either one of two diagonal lines of the rectangular corrected image is positioned on one side of the outer edge of a projection range of the projected image and the other vertex on another side that is positioned adjacent to the one side.

The term "DMD" used herein stands for a digital micromirror device for reflecting incident light from a light source as an image.

With the projector and the distortion correcting method according to the present invention, as described above, it is possible to project images onto the projection surface along the projection optical axis which may be inclined at a relatively large angle of tilt in an upward, downward, leftward, or rightward direction to the projection optical axis. Therefore, the freedom of the installed position of the projector with respect to the projection surface is increased, and any reduction in the image quality of the image corrected by the distortion correcting means is suppressed.

The above and other objects, features, and advantages of the present invention will become apparent from the following description with reference to the accompanying drawings which illustrate examples of the present invention.

DESCRIPTION OF THE PREFERRED EMBODIMENT

Figure 1:
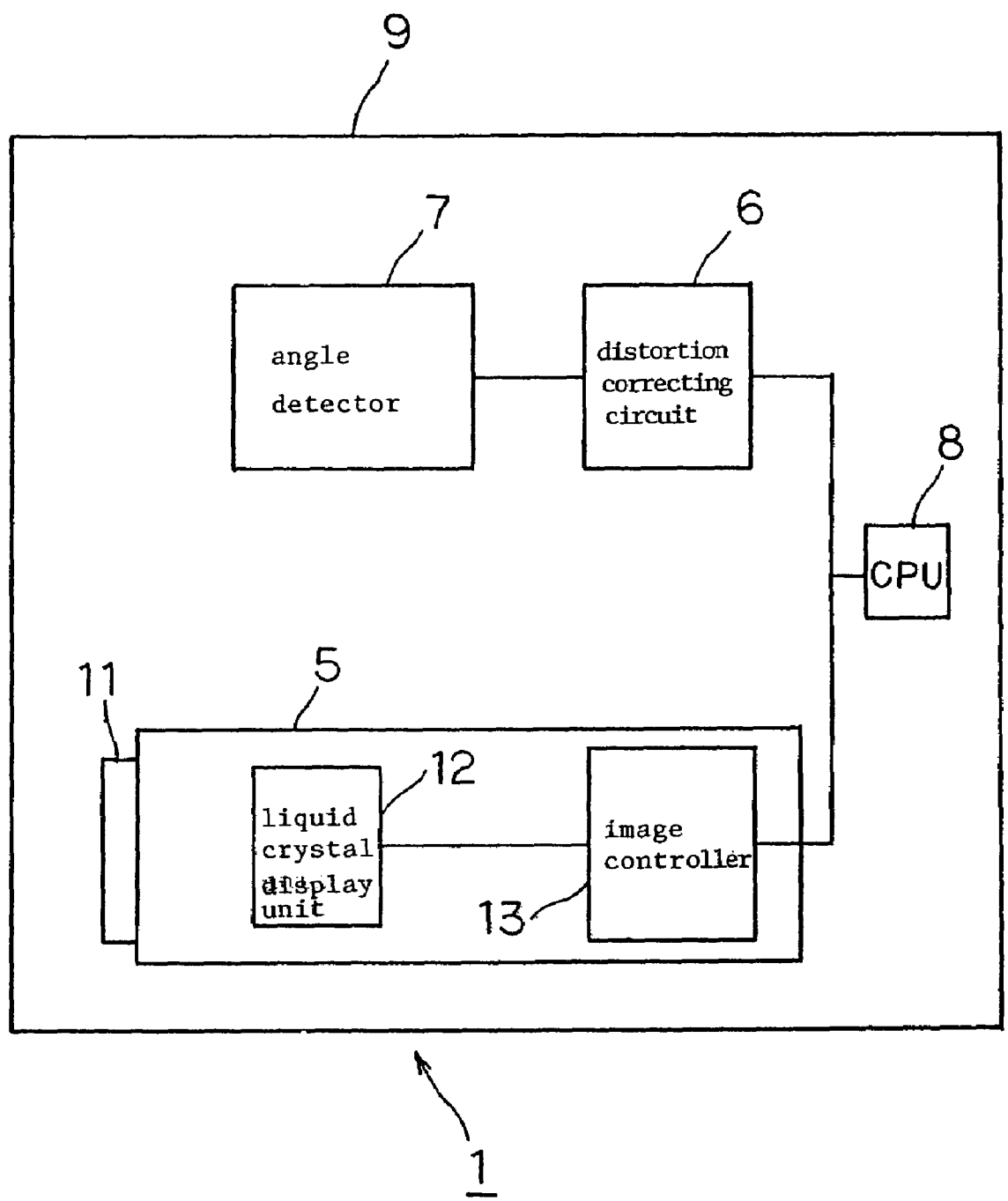
FIG. 1 is a block diagram of a projector according to the present invention.

As shown in FIG. 1, projector 1 according to the present invention comprises projection device 5 having projection lens 11 for projecting an image onto a projection surface such as a screen or the like, distortion correcting circuit 6 as a distortion correcting means for correcting a distortion of an image to be projected onto the projection surface, angle detector 7 for detecting an angle of tilt of a projection optical axis with respect to the projection surface, CPU (Central Processing Unit) 8 for controlling projection device 5 and distortion correcting circuit 6, and housing 9 covering projection device 5, distortion correcting circuit 6, angle detector 7, and CPU 8.

Projection device 5 has, in addition to projection lens 11, liquid crystal display unit 12 for displaying an image to be projected, and image controller 13 for controlling an image to be displayed by liquid crystal display unit 12.

Distortion correcting circuit 6 performs an image deforming process to enlarge and contract an image so that a rectangular corrected image is positioned at a predetermined position in a hypothetical projection range that is generated based on an angle detected by angle detector 7, and outputs a control signal to video controller 13.

Specifically, distortion correcting circuit 6 automatically corrects a projected image such that one of the vertexes on the opposite ends of either one of two diagonal lines of a rectangular corrected image is positioned on one side of the outer edge of the projection range of the projected image and the other vertex on another side that is positioned adjacent to the one side. Stated otherwise, distortion correcting circuit 6 performs the image deforming process to enlarge and contract the corrected image in order to maximize one of the diagonal lines thereof within the projection range of the projected image and also to enlarge and contract the corrected image in order to position the other diagonal line of the corrected image within the projection range.

Based on the control signal from distortion correcting circuit 6, image controller 13 controls liquid crystal display unit 12 to display a substantially rectangular image, thereby projecting a rectangular corrected image onto the projection surface through projection lens 11.

Angle detector 7 has various sensors such as an acceleration sensor for detecting the gravitational acceleration and an optical sensor for detecting the relative position of the projection surface relative to projector 1. Angle detector 7 calculates an angle of tilt in the upward or downward, i.e., vertical, direction of the projection optical axis with respect to the projection surface from the gravitational acceleration detected by the acceleration sensor, and also calculates an angle of tilt in the leftward or rightward, i.e., horizontal, direction of the projection optical axis with respect to the projection surface from the relative position detected by the optical sensor.

A correcting process performed by distortion correcting circuit 6 for correcting a projected image to be formed on the projection surface into a corrected image will be described below.

First, angle detector 7 detects angles of tilt of the projection optical axis with respect to the projection surface. Distortion correcting circuit 6 generates a hypothetical projection range based on the detected angles of tilt. Specifically, distortion correcting circuit 6 generates a theoretical hypothetical projection range based on calculations without detecting an actual projected image formed on the projection surface.

A process of correcting image distortions with respect to different directions of the projection optical axis with respect to the projection surface, which is performed by distortion correcting circuit 6, will be described below.

Figure 2:
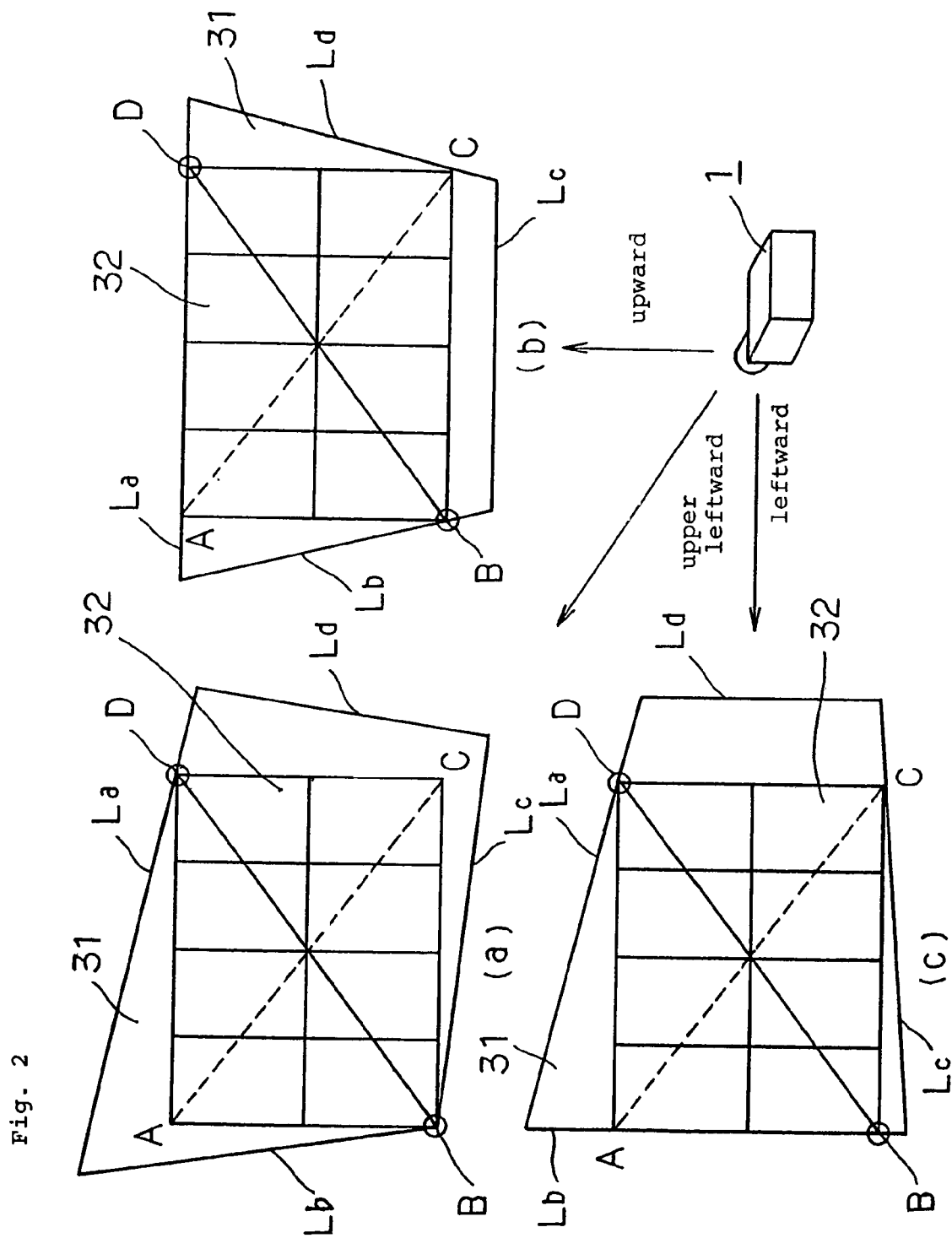
FIGS. 2(a) through 2(c) are diagrams showing projected images formed on projection surfaces with projection optical axes inclined thereto and corrected images, FIG. 2(a) showing the projected and corrected images on the obliquely upper left projection surface, FIG. 2(b) showing the projected and corrected images on the upper projection surface, and FIG. 2(c) showing the projected and corrected images on the left projection surface.

As shown in FIG. 2(a), if an image is projected onto an obliquely upper left projection surface, then distortion correcting circuit 6 performs an image deforming process to position lower left vertex B of corrected image 32 on left side Lb of the projection range of projected image 31 and to position upper right vertex D of corrected image 32 on upper side La of the projection range of projected image 31, thereby obtaining corrected image 32.

As shown in FIG. 2(b), if an image is projected onto a vertically upper projection surface, then distortion correcting circuit 6 performs an image deforming process to position lower left vertex B of corrected image 32 on left side Lb of the projection range and to position upper right vertex D of corrected image 32 on upper side La of the projection range, thereby obtaining corrected image 32. Corrected image 32 corrected by distortion correcting circuit 6 has upper left vertex A positioned on upper side La of the projection range and lower right vertex C positioned on right side Ld of the projection range.

As shown in FIG. 2(c), if an image is projected onto a left projection surface, then distortion correcting circuit 6 performs an image deforming process to position lower left vertex B of corrected image 32 on left side Lb of the projection range and to position upper right vertex D of corrected image 32 on upper side La of the projection range, thereby obtaining corrected image 32. Corrected image 32 corrected by distortion correcting circuit 6 has upper left vertex A positioned on left side Lb of the projection range and lower right vertex C positioned on lower side Lc of the projection range. In FIG. 2(c), the projection optical axis is inclined leftward and slightly upward to the projection surface.

Figure 3:
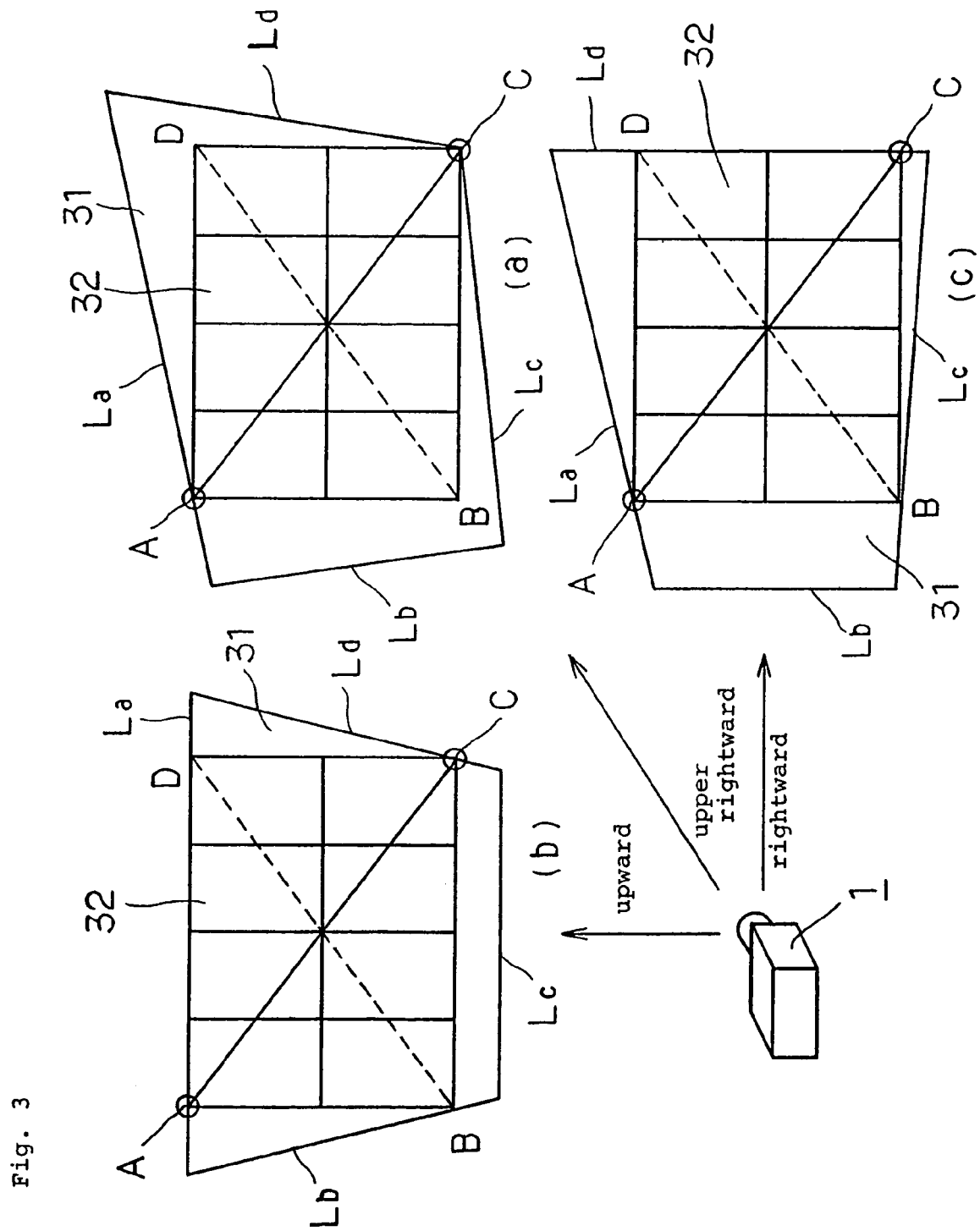
FIGS. 3(a) through 3(c) are diagrams showing projected images formed on projection surfaces with projection optical axes inclined thereto and corrected images, FIG. 3(a) showing the projected and corrected images on the obliquely upper right projection surface, FIG. 3(b) showing the projected and corrected images on the upper projection surface, and FIG. 3(c) showing the projected and corrected images on the right projection surface.

As shown in FIG. 3(a), if an image is projected onto an obliquely upper right projection surface, then distortion correcting circuit 6 performs an image deforming process to position lower right vertex C of corrected image 32 on right side Ld of the projection range and to position upper left vertex A of corrected image 32 on upper side La of the projection range, thereby obtaining corrected image 32.

As shown in FIG. 3(b), if an image is projected onto a vertically upper projection surface, then distortion correcting circuit 6 performs the same image deforming process as the image deforming process described above with respect to FIG. 2(b). Therefore, the image deforming process shown in FIG. 3(b) will not be described below.

As shown in FIG. 3(c), if an image is projected onto a right projection surface, then distortion correcting circuit 6 performs an image deforming process to position lower right vertex C of corrected image 32 on right side Ld of the projection range and to position upper left vertex A of corrected image 32 on upper side La of the projection range, thereby obtaining corrected image 32. Corrected image 32 corrected by distortion correcting circuit 6 has upper right vertex D positioned on right side Ld of the projection range and lower left vertex B positioned on lower side Lc of the projection range. In FIG. 3(c), the projection optical axis is inclined rightward and slightly upward to the projection surface.

Figure 4:
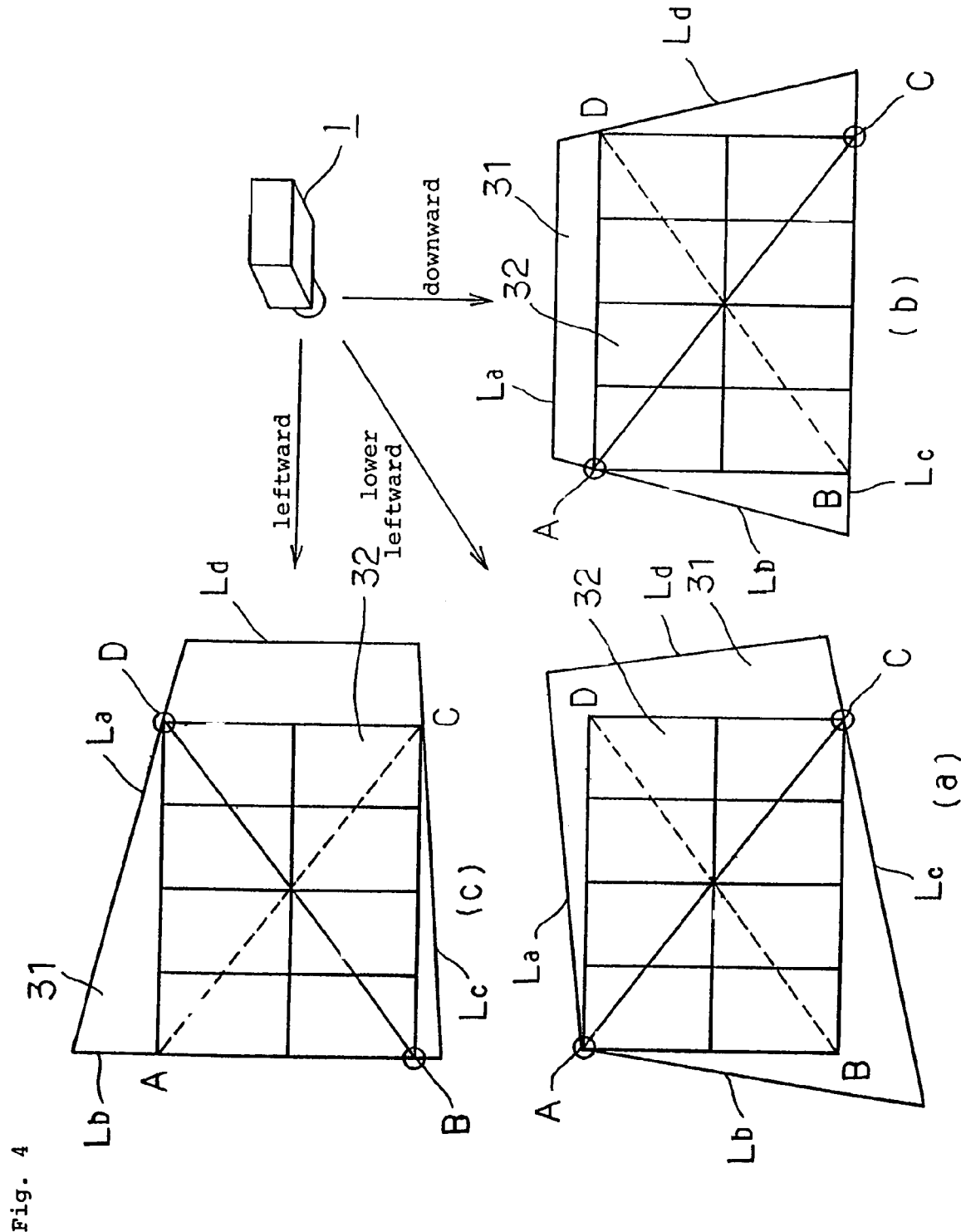
FIGS. 4(a) through 4(c) are diagrams showing projected images formed on projection surfaces with projection optical axes inclined thereto and corrected images, FIG. 4(a) showing the projected and corrected images on the obliquely lower left projection surface, FIG. 4(b) showing the projected and corrected images on the lower projection surface, and FIG. 4(c) showing the projected and corrected images on the left projection surface.

As shown in FIG. 4(a), if an image is projected onto an obliquely lower left projection surface, then distortion correcting circuit 6 performs an image deforming process to position upper left vertex A of corrected image 32 on left side Lb of the projection range and to position lower right vertex C of corrected image 32 on lower side Lc of the projection range, thereby obtaining corrected image 32.

As shown in FIG. 4(b), if an image is projected onto a vertically lower projection surface, then distortion correcting circuit 6 performs an image deforming process to position upper left vertex A of corrected image 32 on left side Lb of the projection range and to position lower right vertex C of corrected image 32 on lower side Lc of the projection range, thereby obtaining corrected image 32. Corrected image 32 corrected by distortion correcting circuit 6 has lower left vertex B positioned on lower side Lc of the projection range and upper right vertex D positioned on right side Ld of the projection range.

As shown in FIG. 4(c), if an image is projected onto a left projection surface, then distortion correcting circuit 6 performs the same image deforming process as the image deforming process described above with respect to FIG. 2(c). Therefore, the image deforming process shown in FIG. 4(c) will not be described below.

Figure 5:
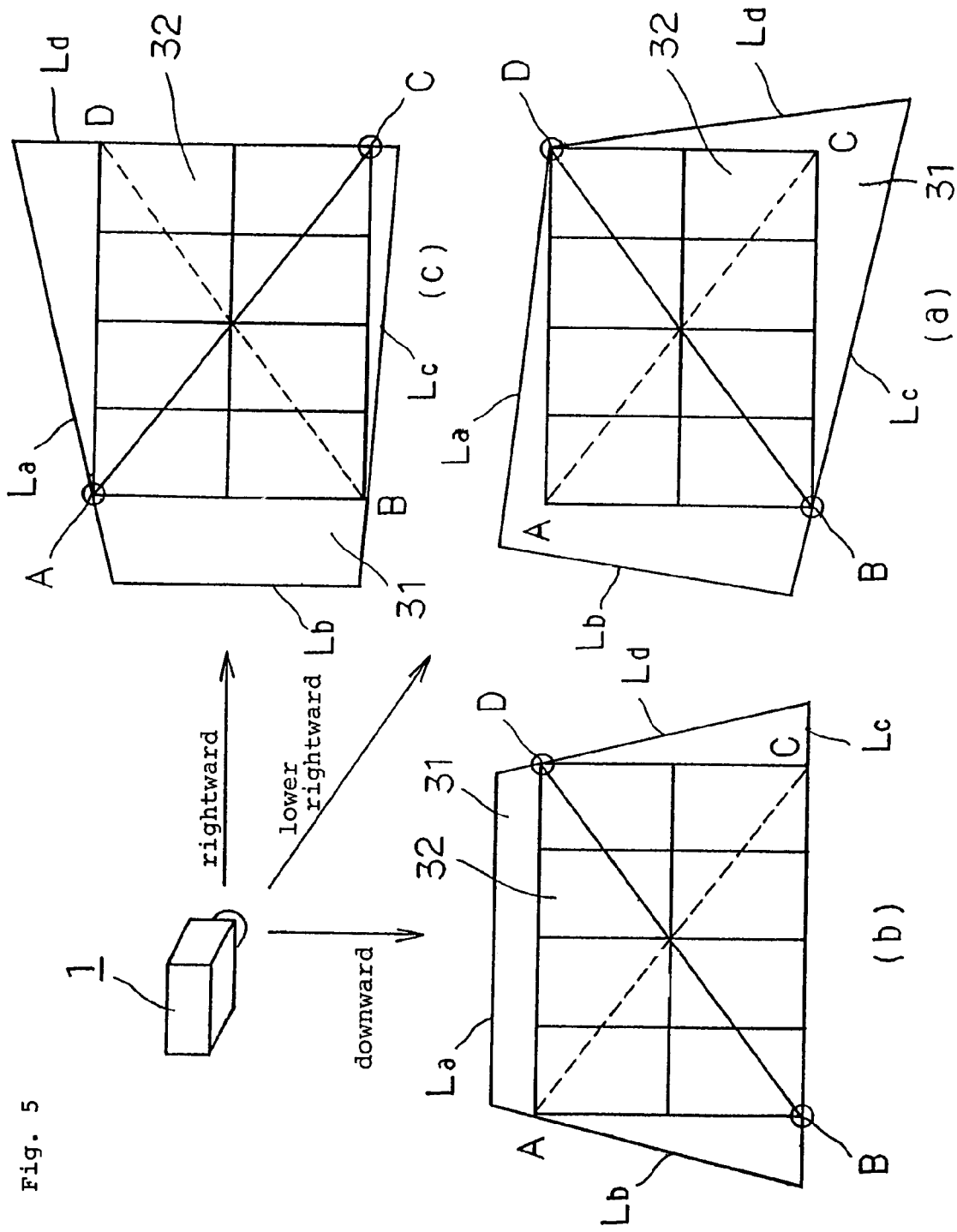
FIGS. 5(a) through 5(c) are diagrams showing projected images formed on projection surfaces with projection optical axes inclined thereto and corrected images, FIG. 5(a) showing the projected and corrected images on the obliquely lower right projection surface, FIG. 5(b) showing the projected and corrected images on the lower projection surface, and FIG. 5(c) showing the projected and corrected images on the right projection surface.

As shown in FIG. 5(a), if an image is projected onto an obliquely lower right projection surface, then distortion correcting circuit 6 performs an image deforming process to position upper right vertex D of corrected image 32 on right side Ld of the projection range and to position lower left vertex B of corrected image 32 on lower side Lc of the projection range, thereby obtaining corrected image 32.

As shown in FIG. 5(b), if an image is projected onto a vertically lower projection surface, then distortion correcting circuit 6 performs the same image deforming process as the image deforming process described above with respect to FIG. 4(b). Therefore, the image deforming process shown in FIG. 5(b) will not be described below.

As shown in FIG. 5(c), if an image is projected onto a right projection surface, then distortion correcting circuit 6 performs the same image deforming process as the image deforming process described above with respect to FIG. 3(c). Therefore, the image deforming process shown in FIG. 5(c) will not be described below.

As described above, with projector 1 according to the present invention, since distortion correcting circuit 6 keeps corrected image 32 in a maximum size within the projection range of projected image 31, any reduction in the image quality due to a contraction of corrected image 32 can be suppressed. As distortion correcting circuit 6 performs the above correcting process, corrected image 32 is obtained satisfactorily even if the projection optical axis is inclined at a relatively large angle of tilt to the projection surface. Consequently, a large allowable range is available for the angle of tilt of the projection optical axis with respect to the projection surface, allowing projector 1 to be installed in positions with increased freedom.

According to the conventional distortion correcting processes, it has been relatively difficult to correct horizontal image distortions with an electronic device such as a semiconductor memory of the distortion correcting circuit. The process of correcting image distortions according to the present invention is highly effective to suppress a reduction in the image quality of corrected image 32 particularly when the projection optical axis is inclined horizontally to the projection surface or when the projection optical axis is inclined both vertically and horizontally to the projection surface.

Projector 1 according to the present invention can easily be realized simply by changing parameters used to correct image distortions with the distortion correcting circuit of a conventional projector. Therefore, projector 1 according to the present invention can be produced without involving an essential increase in the manufacturing cost.

Figure 1A:
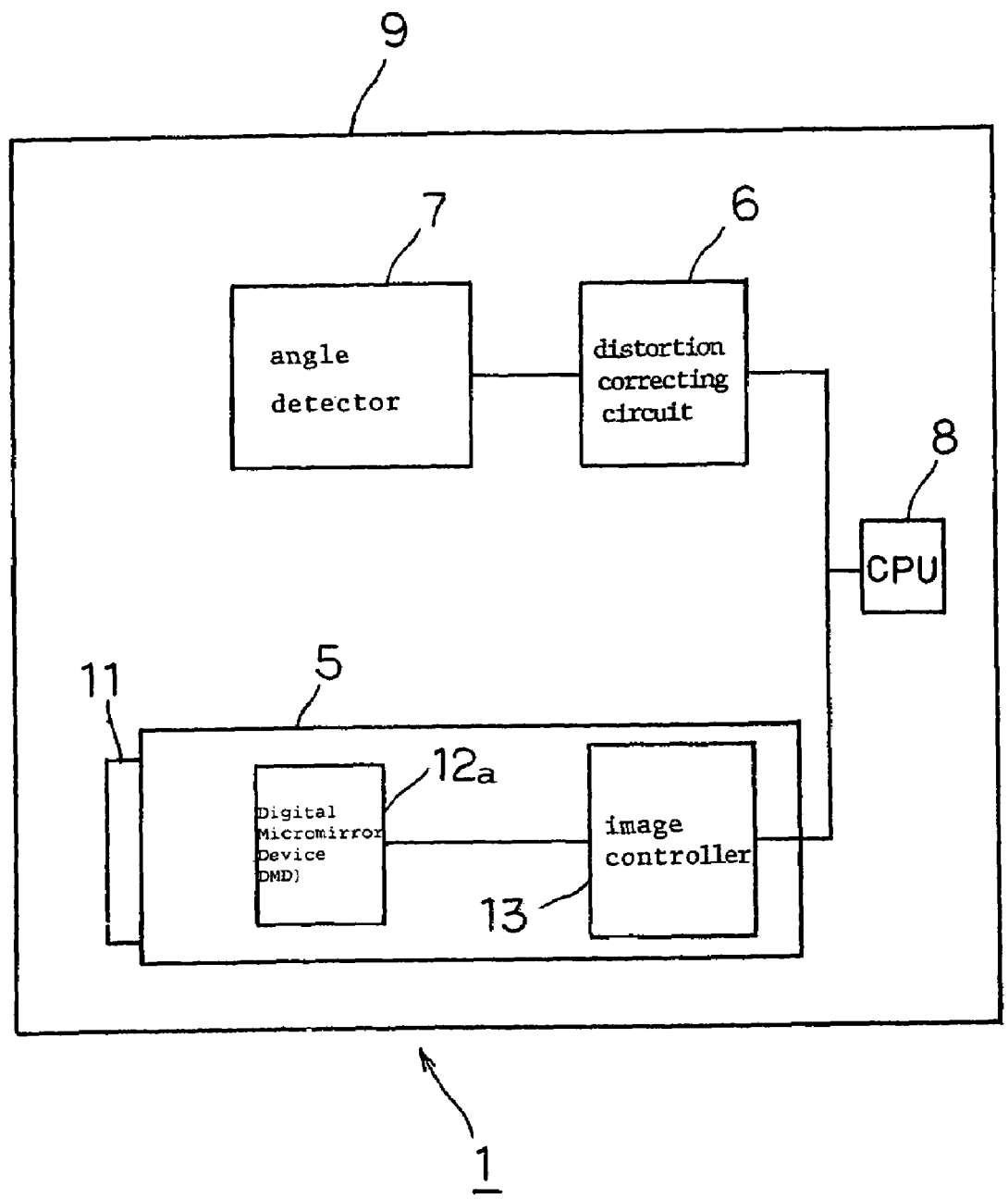
FIG. 1A is a block diagram of a projector according to an alternate exemplary embodiment of the present invention.

Projector 1 according to the illustrated embodiment in FIG. 1 has a liquid crystal display unit 12. However, as seen in FIG. 1A, projector 1 may employ a DMD (Digital Micromirror Device) 12a for reflecting incident light from a light source as an image, instead of liquid crystal display unit 12.

With projector 1 according to the present invention, distortion correcting circuit 6 performs the distortion correcting process based on the angles of tilt of the projection optical axis which are detected by angle detector 7. However, projector 1 may have an image capturing unit for capturing an image, prior to being corrected, which has actually been projected onto the projection surface.

While preferred embodiment of the present invention has been described using specific terms, such description is for illustrative purposes only, and it is to be understood that changes and variations may be made without departing from the spirit or scope of the following claims.

What is claimed is:
1. A projector, comprising:
distortion correcting means for correcting a distorted quadrangular projected image,
wherein the distorted quadrangular projected image is projected onto a projection surface along a projection optical axis inclined in at least one of leftward, rightward, upward, and downward directions, and wherein the distortion correcting means corrects the distorted quadrangular projected image into a rectangular corrected image, such that one of a pair of vertexes disposed at opposite ends of one of two diagonal lines of the rectangular corrected image is positioned on a first side of an outer edge of a projection range of the projected image and the other vertex of the pair of vertexes is positioned on a second side of a projection range of the projected image which is adjacent to the first side.

2. The projector according to claim 1, wherein said distortion correcting means deforms said corrected image to position the other of two diagonal lines of the rectangular corrected image within said projection range.

3. The projector according to claim 1, further comprising detecting means for detecting an angle of tilt of said projection optical axis with respect to said projection surface, wherein said distortion correcting means generates said projection range hypothetically based on the angle of tilt detected by said detecting means.

4. The projector according to claim 2, wherein if the projected image is projected onto an obliquely upper left projection surface, said distortion correcting means positions a lower left vertex of the corrected image on a left side of said projection range and positions an upper right vertex of the corrected image on an upper side of said projection range.

5. The projector according to claim 2, wherein if the projected image is projected onto an obliquely upper right projection surface, said distortion correcting means positions a lower right vertex of the corrected image on a right side of said projection range and positions an upper left vertex of the corrected image on an upper side of said projection range.

6. The projector according to claim 2, wherein if the projected image is projected onto an obliquely lower left projection surface, said distortion correcting means positions an upper left vertex of the corrected image on a left side of said projection range and positions a lower right vertex of the corrected image on a lower side of said projection range.

7. The projector according to claim 2, wherein if the projected image is projected onto an obliquely lower right projection surface, said distortion correcting means positions an upper right vertex of the corrected image on a right side of said projection range and positions a lower left vertex of the corrected image on a lower side of said projection range.

8. The projector according to claim 1, further comprising a display unit for displaying an image to be projected onto said projection surface.

9. The projector according to claim 1, further comprising a DMD for reflecting incident light as an image.

10. A method of correcting an image distortion, comprising:
correcting a distorted quadrangular projected image, which is projected onto a projection surface along a projection optical axis inclined in at least one of leftward, rightward, upward, and downward directions, into a rectangular corrected image;
wherein one of a pair of vertexes disposed at opposite ends of one of two diagonal lines of the rectangular corrected image is positioned on a first side of an outer edge of a projection range of the projected image and the other vertex of the pair of vertexes is positioned on a second side of the outer edge of a projection range of the projected image which is adjacent to the first side.

11. The method according to claim 10, wherein said correcting step comprises deforming said corrected image to position the other of two diagonal lines of the rectangular corrected image within said projection range.

12. The method according to claim 10, further comprising detecting an angle of tilt of said projection optical axis with respect to said projection surface, wherein said correcting step comprises the step of generating said projection range hypothetically based on the detected angle of tilt.

13. The method according to claim 11, wherein if the projected image is projected onto an obliquely upper left projection surface, said correcting step comprises the steps of positioning a lower left vertex of the corrected image on a left side of said projection range and positioning an upper right vertex of the corrected image on an upper side of said projection range.

14. The method according to claim 11, wherein if the projected image is projected onto an obliquely upper right projection surface, said correcting step comprises the steps of positioning a lower right vertex of the corrected image on a right side of said projection range and positioning an upper left vertex of the corrected image on an upper side of said projection range.

15. The method according to claim 11, wherein if the projected image is projected onto an obliquely lower left projection surface, said correcting step comprises the steps of positioning an upper left vertex of the corrected image on a left side of said projection range and positioning a lower right vertex of the corrected image on a lower side of said projection range.

16. The method according to claim 11, wherein if the projected image is projected onto an obliquely lower right projection surface, said correcting step comprises the steps of positioning an upper right vertex of the corrected image on a right side of said projection range and positioning a lower left vertex of the corrected image on a lower side of said projection range.

17. An projector, comprising:
a distortion correcting unit which corrects a distorted quadrangular projected image into a rectangular corrected image;
wherein the distorted quadrangular projected image is projected onto a projection surface along a projection optical axis inclined in at least one of leftward, rightward, upward and downward directions; and
wherein one of a pair of vertexes disposed at opposite ends of one of two diagonal lines of the rectangular corrected image is positioned on a first side of an outer edge of a projection range of the projected image and the other vertex of the pair of vertexes is positioned on a second side of a projection range of the projected image which is adjacent to the first side.

* * * * *